United States Patent Office 3,096,373
Patented July 2, 1963

3,096,373
N,N'-BIS(DI-LOWER-ALKYLAMINO-LOWER-ALKYL) DICARBOXYLIC ACID AMIDES
Frederick K. Kirchner, Delmar, N.Y., assignor to Sterling Drug Inc., New York, N.Y., a corporation of Delaware
No Drawing. Filed Apr. 30, 1956, Ser. No. 581,356
19 Claims. (Cl. 260—558)

This invention relates to new bis-quaternary ammonium salts, and in particular it concerns a class of N,N'-bis(di-lower-alkylamino-lower-alkyl) dicarboxylic acid amides in which both tertiary-amino groups are quaternized with benzyl esters, at least one of the benzyl groups having a halogen or lower-alkoxy group in the 2(ortho)-position. The invention also includes a process for preparing the new compounds, and pharmacodynamic compositions including the novel compounds herein disclosed together with excipients.

N,N' - bis(di - lower - alkylamino - lower - alkyl) dicarboxylic acid amides quaternized with benzyl esters in which the aryl nucleus is unsubstituted or is substituted in the 4-position by a nitro group are known. They possess curare-like activity, but do not possess any appreciable amount of anticholinesterase activity. It has now been found that the compounds formed by introduction of a halogen atom or a lower-alkoxy group in the ortho-position of the aryl nucleus possess significant and useful anticholinesterase activity, some species having exceptionally high activity, several times greater than that of neostigmine.

The compounds of my invention are represented by the following formula

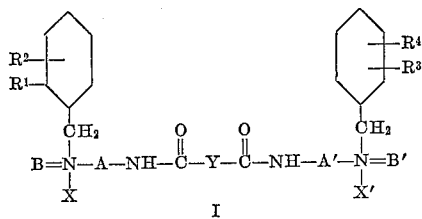

wherein $R^1$ is a member of the group consisting of halogen and lower-alkoxy groups, $R^2$, $R^3$ and $R^4$ are members of the group consisting of hydrogen, halogen and lower-alkoxy groups, A and A' are lower-alkylene radicals, N=B and N=B' are di-lower-alkylamino radicals in which the alkyl groups each have at least two carbon atoms, Y is a member of the group consisting of $C_nH_{2n}$, where $n$ is a whole number from 0 to 6, and the 1,4-phenylene group, X and X' are anions, and the tertiary-amine nitrogens and the amide nitrogens are attached to different carbon atoms of A and A'.

In the above general Formula I the substituent $R^1$ is restricted to the 2-position of the aromatic ring; however, the other substituents $R^2$, $R^3$ and $R^4$ can be in any of the available positions in the aromatic rings indicated, and they can be the same or different. When the substituents are halogen they can be any of the four halogens, fluorine, chlorine, bromine, or iodine. When the substituents are lower-alkoxy groups, they preferably have from one to about four carbon atoms and thus can be methoxy, ethoxy, propoxy, isopropoxy, butoxy, isobutoxy, and the like.

The divalent radicals A and A' represent lower-alkylene radicals in which the free valences are on different carbon atoms. In other words, the amide nitrogen and the tertiary-amino nitrogen are attached to different carbon atoms of A and A'. The radicals A and A' must perforce contain at least 2 carbon atoms, and can contain as many as about 5 carbon atoms. The lower-alkylene radicals are straight or branched and include such radicals as ethylene, —$CH_2CH_2$—; 1,3-propylene,

—$CH_2CH_2CH_2$—

1,2-propylene, —$CH(CH_3)CH_2$—; 1,4-butylene,

—$CH_2CH_2CH_2CH_2$—

1,5-pentylene, —$CH_2CH_2CH_2CH_2CH_2$—; 1,2-dimethylethylene, —$CH(CH_3)CH(CH_3)$—; and the like.

In the above general Formula I the di-lower-alkylamino radicals N=B and N=B' contain alkyl radicals each having at least two carbon atoms and they can have as many as about four carbon atoms. Thus N=B and N=B' represent such groups as diethylamino, ethylpropylamino, dipropylamino, diisopropylamino, dibutylamino, and the like. Compounds containing the dimethylamino radical are relatively inactive as anticholinesterase agents.

In the above general Formula I, the divalent radical Y represents $C_nH_{2n}$, where $n$ is a whole number from 0 to 6, or the 1,4-phenylene group. The grouping $C_nH_{2n}$, when $n$ is a positive integer, represents a lower-alkylene bridge between the carbonyl groups. When $n$ is 0 there are no carbon atoms intervening between the carbonyl groups which in this case are joined directly. Thus there is contemplated a series of aliphatic dicarboxylic acid amides including oxamides, malonamides, succinamides, glutaramides, adipamides, pimelamides and suberamides. The grouping $C_nH_{2n}$ is not necessarily a straight chain, but can be branched, including such divalent radicals as —$CH(CH_3)$—, —$CH(CH_3)CH_2$—,

—$CH(CH_3)CH(CH_3)$—

—$CH_2CH(C_2H_5)$—, —$CH_2CH_2CH_2CH(CH_3)$—, and the like. The invention thus includes amides of lower-alkylated malonic, succinic, glutaric, adipic and pimelic acids.

The nature of the anions X and X' in the above general Formula I is immaterial since the physiological activity of the compound resides solely within the cation portion of the molecule. Even anions which are ordinarily considered as toxic, such as fluoride or cyanide, can be used because the compounds are effective in such small doses, less than a milligram per kilogram of body weight, that the concentration of anion would never reach a toxic level. However, preferred compounds are those in which X is chloride, bromide or iodide, since these are derived from readily available starting materials.

A preferred class of the compounds of my invention are those of the general Formula I above wherein Y represents a single chemical bond, that is, the compounds which are derivatives of oxamide. A particularly preferred group are symmetrical compounds of the formula

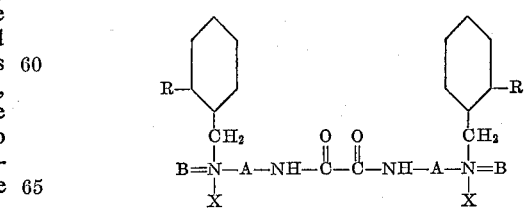

wherein R is a halogen or lower-alkoxy and B=N, A and X have the meanings previously given. Optimum anticholinesterase activity occurs in the compounds where R is halogen, B=N is diethylamino, and A is ethylene.

Symmetrical compounds of my invention having the formula

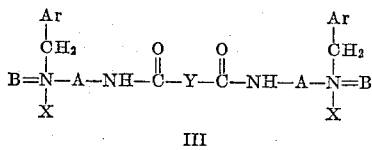

III wherein Ar is a phenyl group substituted by one or two halogen or lower-alkoxy groups, one such group being in the ortho-position, and Y, B=N, A and X have the meanings given previously, are prepared by treating a compound having the formula

B=N—A—NH—CO—Y—CO—NH—A—N=B with at least two molar equivalents of a compound having the formula ArCH$_2$X. The reaction is carried out by simply mixing the reactants, and it will take place slowly at room temperature or below, although application of heat is preferred to speed up the reaction, and a reaction medium inert under the conditions of the reaction, such as acetonitrile, dimethylformamide, and the like, can be used. If an inert solvent is used, the quaternary ammonium salt separates from solution upon cooling, or can be obtained by concentration of the solution.

The quaternization reaction takes place most readily with benzyl esters ArCH$_2$X where X is the anion of a strong acid, e.g., halide, sulfate, phosphate, and the like. The chloride, bromide or iodide are preferred because of the more ready availability of the requisite substituted benzyl halides. Compounds wherein the anion X is other than halogen, for example, the nitrate, sulfate, or phosphate, and in particular anions derived from weak acids such as the acetate, citrate, oleate, lactate and the like, can be most conveniently prepared from quaternary ammonium salts wherein X is halogen. This procedure is carried out by treating the bis-halide with silver oxide which produces the corresponding quaternary ammonium hydroxide, the halide ions being removed in the form of silver halide. The quaternary ammonium hydroxide can then be converted to any desired salt by neutralization with the appropriate acid. Alternatively, ion exchange can be effected by crystallization from an aqueous solution containing an excess of the desired anion, or by contact with an anion exchange resin saturated with the desired anion.

The intermediate bis-amides,

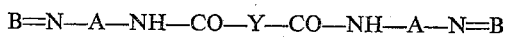

are prepared by treating an ester of a dibasic acid, RO—CO—Y—CO—OR, where R is a lower-alkyl group, with two molar equivalents of a compound having the formula B=N—A—NH$_2$. The reaction takes place upon simple admixture of the components at room temperature, although heat may be used to insure completion of the reaction. A reaction medium inert under the conditions of the reaction, such as xylene, benzene, toluene, and the like, can be used although it is not prerequisite.

Unsymmetrical compounds of my invention can be prepared according to the following series of reactions:

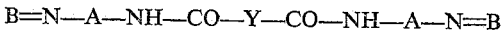

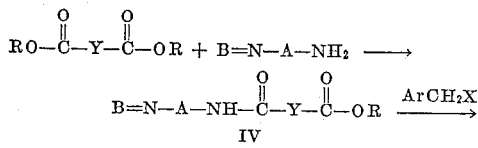

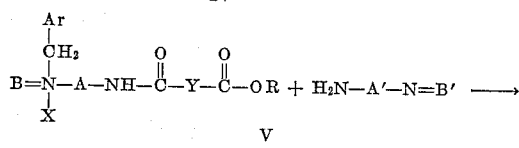

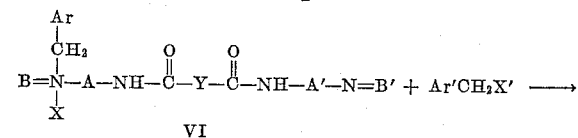

VI

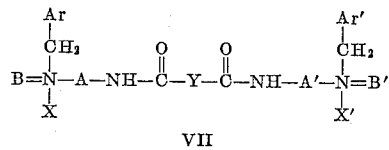

VII

A di-lower-alkylamino-lower-alkylamine,

is reacted with a dialkyl ester of a dicarboxylic acid, ROCO—Y—COOR (R is lower-alkyl, and Y, N=B and A have the meanings given above), to give a half ester half amide (IV). An excess of dialkyl ester, preferably two molar equivalents relative to amine, is used in the reaction to minimize formation of the bis-amide. The ester-amide IV is then quaternized with an aralkyl halide, ArCH$_2$X, wherein Ar is one of the aryl groups in Formula I and X is an anion, to give the quaternized ester-amide (V). The latter is then condensed with a di-lower-alkylamino-lower-alkylamine, H$_2$N—A'—N=B', which can be the same as or different from the B=N—A—NH$_2$ used in the first step, to give a bis-amide monoquaternary salt (VI). The final step is a quaternization with an aralkyl halide, Ar'CH$_2$X', to yield compounds within the scope of the present invention having Formula VII. The monoquaternary ammonium salts of Formula VI are described in detail in my copending application, Serial No. 544,601, filed November 2, 1955, now U.S. Patent 2,857,390, issued October 21, 1958.

Pharmacological evaluation of the compounds of the invention has established that these substances possess significant anticholinesterase activity and curare antagonizing properties, and are useful in anesthesiology for counteracting the effects of d-tubocurarine and in the treatment of myasthenia gravis.

The following examples will further illustrate the invention without limiting the latter thereto. The structure of the compounds is established by the mode of preparation and by chemical analysis.

EXAMPLE 1

(a) N,N'-Bis(2-Diethylaminoethyl)Oxamide

A solution of 150 g. (1.32 mole) of 2-diethylaminoethylamine in 250 ml. of xylene was gradually added to a solution of 73.0 g. (0.5 mole) of ethyl oxalate in 250 ml. of xylene, with external cooling. The mixture was then refluxed for eight hours, cooled and diluted with ether. The ether-xylene solution was extracted with 10% hydrochloric acid, and the hydrochloric acid extracts were in turn extracted with ether and then made alkaline with 35% sodium hydroxide solution. The organic material which separated was extracted with ether, and the ether solution was dried over anhydrous sodium sulfate and concentrated, giving 106.5 g. of N,N'-bis(2-diethylaminoethyl)oxamide, M.P. 40–42° C.

(b) N,N'-Bis(2-Diethylaminoethyl)Oxamide Bis(2-Chlorobenzochloride)

[II; R is Cl, A is CH$_2$CH$_2$, N=B is N(C$_2$H$_5$)$_2$, X is Cl]

A solution of 7 g. (0.025 mole) of N,N'-bis(2-diethylaminoethyl)oxamide and 16.1 g. (0.1 mole) of 2-chlorobenzyl chloride in 100 ml. of acetonitrile was refluxed for eleven hours. The solid which separated upon cooling was collected by filtration and recrystallized by dissolving it in ethanol and adding ether to cause the product to separate. After drying at about 60° C. (1–3 mm.) there was obtained 4.1 g. of N,N'-bis(2-diethylaminoethyl)oxamide bis(2-chlorobenzochloride), M.P. 196–199° C.

*Analysis.*—Calcd. for $C_{28}H_{42}Cl_4N_4O_2$: N, 9.20; Cl⁻, 11.65. Found: N, 9.37; Cl⁻, 11.46.

When recrystallized from water this compound is obtained in the form of a tetrahydrate.

The anticholinesterase activity of N,N'-bis(2-diethylaminoethyl)oxamide bis(2-chlorobenzochloride), as measured by the electrometric method for the determination of red blood cell and plasma cholinesterase activity [Michel, J. Lab. Clin. Med. 34, 1564 (1949)], was found to have 580% of the activity of neostigmine methylsulfate.

By substitution in the preceding example of the 2-chlorobenzyl chloride by a molar equivalent amount of 2-chlorobenzyl bromide or 2-chlorobenzyl iodide, there can be obtained, respectively, N,N'-bis(2-diethylaminoethyl)oxamide bis(2-chlorobenzobromide) or N,N'-bis(2-diethylaminoethyl)oxamide bis(2-chlorobenziodide).

By stirring an aqueous solution of N,N'-bis(2-diethylaminoethyl)oxamide bis(2-chlorobenzochloride) with an excess of silver oxide, filtering the suspension, and neutralizing the filtrate with sulfuric acid, phosphoric acid, acetic acid, lactic acid, tartaric acid, quinic aid or methanesulfonic acid, there can be obtained, respectively, N,N'-bis-(2-diethylaminoethyl)oxamide bis(2-chlorobenzosulfate), N,N'-bis(2-diethylaminoethyl)oxamide bis(2-chlorobenzophosphate), N,N'-bis(2-diethylaminoethyl)oxamide bis-(2 - chlorobenzoacetate), N,N'-bis(2-diethylaminoethyl)-oxamide bis(2-chlorobenzolactate), N,N'-bis(2-diethylaminoethyl)oxamide bis(2-chlorobenzotartrate), N,N'-bis(2 - diethylaminoethyl)oxamide bis(2-chlorobenzoquinate), or N,N'-bis(2-diethylaminoethyl)oxamide bis(2-chlorobenzomethanesulfonate).

EXAMPLE 2

*N,N'-Bis(2-Diethylaminoethyl)Oxamide Bis(2-Methoxybenzochloride)*

[II; R is $CH_3O$, A is $CH_2CH_2$, N=B is $N(C_2H_5)_2$, X is Cl]

A solution of 7 g. (0.025 mole) of N,N'-bis(2-diethylaminoethyl)oxamide and 15.6 g. (0.1 mole) of 2-methoxybenzyl chloride in 100 ml. of acetonitrile was refluxed for seven hours. The product was worked up by the manipulative procedure described in Example 1, part (b), giving 16.4 g. of N,N'-bis(2-diethylaminoethyl)oxamide bis(2-methoxybenzochloride), M.P. 205–206° C. Another recrystallization from alcohol gave a sample melting at 215° C.

*Analysis.*—Calcd. for $C_{30}H_{48}Cl_2N_4O_4$: N, 9.34; Cl, 11.82. Found: N, 9.28; Cl, 11.82.

The anticholinesterase activity of N,N'-bis(2-diethylaminoethyl)oxamide bis(2-methoxybenzochloride) was found to be 14% that of neostigmine methylsulfate.

EXAMPLE 3

*N,N'-Bis(2-Diethylaminoethyl)Oxamide Bis(2,4-Dichlorobenzochloride)*

[III; Ar is $2,4-Cl_2C_6H_3$, A is $CH_2CH_2$
N=B is $N(C_2H_5)_2$, Y is a single bond, X is Cl]

A solution of 14.3 g. (0.05 mole) of N,N'-bis(2-diethylaminoethyl)oxamide and 25.4 g. (0.13 mole) of 2,4-dichlorobenzyl chloride in 160 ml. of acetonitrile was refluxed for seven hours. The solid which separated upon cooling and standing was collected by filtration, recrystallized from isopropyl alcohol and dried, giving N,N'-bis(2-diethylaminoethyl)oxamide bis(2,4 - dichlorobenzochloride), M.P. 218–220° C.

*Analysis.*—Calcd. for $C_{28}H_{40}Cl_6N_4O_2$: N, 8.27; Cl⁻, 10.47. Found: N, 8.41; Cl⁻, 10.35.

The anticholinesterase activity of N,N'-bis(2-diethylaminoethyl)oxamide bis(2,4-dichlorobenzochloride) was found to be 340% that of neostigmine methylsulfate.

EXAMPLE 4

*N,N'-Bis(2-Diethylaminoethyl)Oxamide Bis(2-Bromobenzobromide)*

[II; R is Br, A is $CH_2CH_2$, N=B is $N(C_2H_5)_2$, X is Br]

A solution of 14.3 g. (0.05 mole) of N,N'-bis(2-diethylaminoethyl)oxamide and 32.5 g. (0.13 mole) of 2-bromobenzylbromide in 180 ml. of acetonitrile was refluxed for forty-five minutes. The solid material which separated was collected by filtration, recrystallized from methanol and dried, giving 28.3 g. of N,N'-bis(2-diethylaminoethyl)oxamide bis(2 - bromobenzobromide), M.P. 216–220° C.

*Analysis.*—Calcd. for $C_{28}H_{42}Br_4N_4O_2$: N, 7.13; Br⁻, 20.3. Found: N, 7.12; Br⁻, 20.1.

The anticholinesterase activity of N,N'-bis(2-diethylaminoethyl)oxamide bis(2 - bromobenzobromide) was found to be 4100% that of neostigmine methylsulfate.

EXAMPLE 5

*N,N'-Bis(2-Diethylaminoethyl)Oxamide Bis(2-Fluorobenziodide)*

[II; R is F, A is $CH_2CH_2$, N=B is $N(C_2H_5)_2$, X is I]

A solution of 14.3 g. (0.05 mole) of N,N'-bis(2-diethylaminoethyl)oxamide and 19.0 g. (0.13 mole) of 2-fluorobenzyl chloride in 100 ml. of acetonitrile was refluxed for two hours. The solid material which separated was recrystallized twice from an ethanol-ether mixture, and the resulting product, M.P. 215–217° C., was dissolved in 20 ml. of deionized water and poured into a solution of 1.0 g. of potassium iodide in 5 ml. of deionized water. The solid material which separated was collected by filtration and recrystallized from water giving N,N'-bis(2-diethylaminoethyl)oxamide bis(2-fluorobenziodide), M.P. 220–222° C. (dec.).

*Analysis.*—Calcd. for $C_{28}H_{42}F_2I_2N_4O_2$: N, 7.39; I⁻, 33.5. Found: N, 7.26; I⁻, 33.6.

EXAMPLE 6

*N,N'-Bis(2-Diethylaminoethyl)Oxamide Bis(2-Iodobenzobromide)*

[II; R is I, A is $CH_2CH_2$, N=B is $N(C_2H_5)_2$, X is Br]

A solution of 4.15 g. (0.015 mole) of N,N'-bis(2-diethylaminoethyl)oxamide and 9.0 g. (0.031 mole) of 2-iodobenzyl bromide (M.P. 56–58° C.) in 60 ml. of acetonitrile was refluxed for two hours. The solid material which separated was collected by filtration, washed with boiling ethanol and recrystallized from a large volume of water, giving 3.1 g. of N,N'-bis(2-diethylaminoethyl)oxamide bis(2 - iodobenzobromide), M.P. 231–236° C..

*Analysis.*—Calcd. for $C_{28}H_{42}Br_2I_2N_4O_2$: N, 6.36; Br⁻, 18.16. Found: N, 6.44; B⁻, 17.85.

The anticholinesterase activity of N,N'-bis(2-diethylaminoethyl)oxamide bis(2-iodobenzobromide) was found to be 770% that of neostigmine methylsulfate.

By substitution of the 2-iodobenzyl bromide in the preceding example by a molar equivalent amount of 2-ethoxybenzyl chloride, 2-butoxybenzyl chloride, 2-chloro-4-methoxybenzyl chloride or 2-methoxy-3-bromobenzyl bromide, there can be obtained, respectively, N,N'-bis(2-diethylaminoethyl)oxamide bis(2 - ethoxybenzochloride), N,N'-bis(2-diethylaminoethyl)oxamide bis(2-butoxybenzochloride), N,N''-bis(2-diethylaminoethyl)oxamide bis-(2-chloro-4-methoxybenzochloride) or N,N'-bis(2-diethylaminoethyl)-oxamide bis(2-methoxy-3-bromobenzobromide).

EXAMPLE 7

(a) N,N'-bis(3-diethylaminopropyl)oxamide was prepared from 37.0 g. (0.25 mole) of ethyl oxalate and 70.0 g. (0.54 mole) of 3-diethylaminopropylamine according to the manipulative procedure described in Example 1, part (a). There was obtained 71.2 g. of N,N'-bis(3- diethylaminopropyl)oxamide. It had the M.P. 47° C. when recrystallized from n-hexane.

*Analysis.*—Calcd. for $C_{16}H_{34}N_4O_2$: N, 17.82. Found: N, 18.14.

(b) *N,N'-Bis(3-Diethylaminopropyl)Oxamide Bis(2-Chlorobenzochloride)*

[II; R is Cl, A is $CH_2CH_2CH_2$, N=B is $N(C_2H_5)_2$, X is Cl]

A solution of 15.7 g. (0.05 mole) of N,N'-bis(3-diethylaminopropyl)oxamide and 32.2 g. (0.2 mole) of 2-chlorobenzyl chloride in 160 ml. of acetonitrile was refluxed for eight hours. The product was worked up by the manipulative procedure described in Example 1, part (b), and dried over phosphorus pentoxide in a vacuum desiccator, giving 28.0 g. of N,N'-bis(3-diethylaminopropyl)oxamide bis(2-chlorobenzochloride), M.P. about 130° C. This compound was very hygroscopic.

*Analysis.*—Calcd. for $C_{30}H_{46}Cl_4N_4O_2$: N, 8.80; Cl⁻, 11.14. Found: N, 8.74; Cl⁻, 10.90.

The anticholinesterase activity of N,N'-bis(3-diethylaminopropyl)oxamide bis(2-chlorobenzochloride) was found to be 20% that of neostigmine methylsulfate.

(c) *N,N'-Bis(3-Diethylaminopropyl)Oxamide Bis(2-Chlorobenziodide)*

[II; R is Cl, A is $CH_2CH_2CH_2$, N=B is $N(C_2H_5)_2$, X is I]

To an aqueous solution of 3.8 g. (0.005 mole) of N,N'-bis(3-diethylaminopropyl)oxamide bis(2-chlorobenzochloride) was added a solution of 2.0 g. (0.015 mole) of potassium iodide in 5 ml. of water. An oil separated which gradually crystallized, and the latter was collected by filtration and recrystallized from water, giving 2.2 g. of N,N'-bis(3-diethylaminopropyl)-oxamide bis(2-chlorobenziodide, M.P. 173–175° C. (dec.).

*Analysis.*—Calcd. for $C_{30}H_{46}Cl_2I_2N_4O_2$: I, 30.9. Found: I, 31.2.

EXAMPLE 8

*N,N'-Bis(3-Diethylaminopropyl)Oxamide Bis(2,4-Dichlorobenzochloride)*

[III; Ar is 2,4-$Cl_2C_6H_3$, A is $CH_2CH_2CH_2$, N=B is $N(C_2H_5)_2$, Y is a single bond, X is Cl]

A solution of 15.7 g. (0.05 mole) of N,N'-bis(3-diethylaminopropyl)oxamide and 25.4 g. (0.13 mole) of 2,4-dichlorobenzyl chloride in 160 ml. of acetonitrile was refluxed for seven hours. The solution was decolorized with activated charcoal and concentrated in vacuo. The residue was recrystallized first from an ethanol-ether mixture and then twice from an isopropyl alcohol-ether mixture, giving 13.3 g. of N,N'-bis(3-diethylaminopropyl)oxamide bis(2,4-dichlorobenzochloride), M.P. 186–187° C. (dec.).

*Analysis.*—Calcd. for $C_{30}H_{44}Cl_6N_4O_2$: N, 7.94; Cl⁻, 10.05. Found: N, 8.08; Cl⁻, 10.30.

EXAMPLE 9

*N,N'-Bis(3-Diethylaminopropyl)Oxamide Bis(2-Methoxybenzochloride)*

[II; R is $OCH_3$, A is $CH_2CH_2CH_2$, N=B is $N(C_2H_5)_2$, X is Cl]

A solution of 15.9 g. (0.05 mole) of N,N'-bis(3-diethylaminopropyl)oxamide and 20.4 g. (0.13 mole) of 2-methoxybenzyl chloride in 180 ml. of acetonitrile was refluxed for eight hours. After standing for about fifteen hours at room temperature the solution was refluxed for four hours and concentrated in vacuo. The residue was crystallized from an ethanol-ether mixture, giving 25.0 g. of N,N'-bis(3-diethylaminopropyl)oxamide bis(2-methoxybenzochloride), M.P. 198–200°C.

*Analysis.*—Calcd. for $C_{32}H_{52}Cl_2N_4O_4$: N, 8.96; Cl⁻, 11.30. Found: N, 8.83; Cl⁻, 11.12.

EXAMPLE 10

*N,N'-Bis(3-Diethylaminopropyl)Oxamide Bis(2-Bromobenzobromide)*

[II; R is Br, A is $CH_2CH_2CH_2$, N=B is $N(C_2H_5)_2$, X is Br]

A solution of 15.9 g. (0.05 mole) of N,N'-bis(3-diethylaminopropyl)oxamide and 32.5 g. (0.13 mole) of 2-bromobenzylbromide in 180 ml. of acetonitrile was refluxed for seven hours. The solution was concentrated in vacuo and the residue recrystallized three times from a methanol-ether mixture, giving 10.1 g. of N,N'-bis(3-diethylaminopropyl)oxamide bis(2-bromobenzobromide), M.P. 205–209° C.

*Analysis.*—Calcd. for $C_{30}H_{46}Br_4N_4O_2$: N, 6.88; Br⁻, 19.63. Found: N, 6.81; Br⁻, 19.17.

The anticholinesterase activity of N,N'-bis(3-diethylaminopropyl)oxamide bis(2-bromobenzobromide) was found to be 88% that of neostigmine methylsulfate.

EXAMPLE 11

*N,N'-Bis(3-Diethylaminopropyl)Oxamide Bis(2-Fluorobenzochloride)*

[II; R is F, A is $CH_2CH_2CH_2$, N=B is $N(C_2H_5)_2$, X is Cl]

A solution of 15.9 g. (0.05 mole) of N,N'-bis(3-diethylaminopropyl)oxamide and 18.8 g. (0.13 mole) of 2-fluorobenzyl chloride (B.P. 76–8° C./21 mm., $$n_D^{26} = 1.3946$$

prepared from 2-fluorotoluene and sulfuryl chloride in the presence of benzoyl peroxide) in 180 ml. of acetonitrile was refluxed for three hours. The solution was allowed to stand for two days at room temperature, then refluxed for eight hours longer and concentrated in vacuo. The residue was crystallized from an ethanol-ether mixture giving 22.3 g. of N,N'-bis(3-diethylaminopropyl)oxamide bis(2-fluorobenzochloride), M.P. 145–165° C.

*Analysis.*—Calcd. for $C_{30}H_{46}Cl_2F_2N_4O_2$: N, 9.28; Cl⁻, 11.74. Found: N, 9.45; Cl⁻, 11.51.

EXAMPLE 12

*N,N'-Bis(3-Diethylaminopropyl)oxamide Bis(2-Iodobenzobromide)*

[II; R is I, A is $CH_2CH_2CH_2$, N=B is $N(C_2H_5)_2$, X is Br]

A solution of 4.7 g. (0.015 mole) of N,N'-bis(3-diethylaminopropyl)oxamide and 9.0 g. (0.031 mole) of 2-iodobenzyl bromide in 60 ml. of acetonitrile was refluxed for two hours. The solid which separated was collected by filtration, washed with boiling methanol and recrystallized from water, giving 6.6 g. of N,N'-bis(3-diethylaminopropyl)oxamide bis (2-iodobenzobromide), M.P. 225–227° C.

*Analysis.*—Calcd. for $C_{30}H_{46}Br_2I_2N_4O_2$: N, 6.17; Br⁻, 17.60. Found: N, 6.20; Br⁻, 17.22.

The anticholinesterase activity of N,N'-bis(3-diethylaminopropyl)oxamide bis(2-iodobenzobromide) was found to be 33.6% that of neostigmine methylsulfate.

EXAMPLE 13

(a) N,N'-bis(2-diethylaminoethyl)malonamide was prepared from 40 g. (0.25 mole) of ethyl malonate and 62.6 g. (0.54 mole) of 2-diethylaminoethylamine according to the manipulative procedure described in Example 1, part (a). There was thus obtained 26.2 g. of N,N'-bis- (2-diethylaminoethyl)malonamide, B.P. 185–195° C. (0.3 mm.).

(b) *N,N′-Bis(2-Diethylaminoethyl)malonamide Bis(2-Chlorobenzochloride)*

[III; Ar is 2-ClC$_6$H$_4$, A is CH$_2$CH$_2$, N=B is N(C$_2$H$_5$)$_2$, Y is CH$_2$, X is Cl]

A solution of 15 g. (0.05 mole) of N,N′-bis(2-diethylaminoethyl)malonamide and 32.2 g. (0.2 mole) of 2-chlorobenzyl chloride in 100 ml. of acetonitrile was refluxed for five hours. The product was worked up by the manipulative procedure described in Example 1, part (b), and the product was dried in a vacuum desiccator over phosphorus pentoxide and then in a vacuum oven at 40° C. (1–3 mm.), giving 21.8 g. of N,N′-bis(2-diethylaminoethyl)malonamide bis (2 - chlorobenzochloride), M.P. about 165° C. This product was very hygroscopic.

EXAMPLE 14

(a) N,N′-bis(3-diethylaminopropyl)malonamide was prepared from 40 g. (0.25 mole) of ethyl malonate and 70.3 g. (0.54 mole) of 3-diethylaminopropylamine according to the manipulative procedure described in Example 1, part (a). The N,N′-bis(3-diethylaminopropyl)-malonamide obtained had the B.P. 195–200° C. (0.3 mm.).

(b) *N,N′-Bis(3-Diethylaminopropyl)malonamide Bis(2-Chlorobenzochloride)*

[III; Ar is 2-ClC$_6$H$_4$, A is CH$_2$CH$_2$CH$_2$, N=B is N(C$_2$H$_5$)$_2$, Y is CH$_2$, X is Cl]

A solution of 16.4 g. (0.05 mole) of N,N′-bis(3-diethylaminopropyl)malonamide and 32.2 g. (0.2 mole) of 2-chlorobenzyl chloride in 100 ml. of acetonitrile was refluxed for five hours. The product was worked up by the manipulative procedure described in Example 1, part (b) and dried in a vacuum desiccator over phosphorus pentoxide, giving 13.8 g. of N.N′-bis(3-diethylaminopropyl)malonamide bis(2-chlorobenzochloride). The product was very hygroscopic and had an indefinite melting point.

*Analysis.*—Calcd. for C$_{31}$H$_{48}$Cl$_4$N$_4$O$_2$: N, 8.61; Cl$^-$, 10.90. Found: N, 8.31; Cl$^-$, 10.26.

EXAMPLE 15

(a) N,N′-bis(2-diethylaminoethyl)succinamide was prepared from 43.5 g. (0.025 mole) of ethyl succinate and 62.6 g. (0.54 mole) of 2-diethylaminoethylamine according to the manipulative procedure described in Example 1, part (a).

(b) *N,N′-Bis(2-Diethylaminoethyl)succinamide Bis(2-Chlorobenzochloride)*

[III; Ar is 2-ClC$_6$H$_4$, A is CH$_2$CH$_2$, N=B is N(C$_2$H$_5$)$_2$, Y is CH$_2$CH$_2$, X is Cl]

A solution of 11.0 g. of N,N′-bis(2-diethylaminoethyl)-succinamide and 22.5 g. of 2-chlorobenzyl chloride in 100 ml. of acetonitrile was refluxed for four hours. The product was worked up according to the manipulative procedure described in Example 1, part (b), and dried in a vacuum oven at 80° C., giving 8.7 g. of N,N′-bis(2-diethylaminoethyl)succinamide bis(2-chlorobenzochloride), M.P. 199° C.

*Analysis.*—Calcd. for C$_{30}$H$_{46}$Cl$_4$N$_4$O$_2$: N, 8.80; Cl$^-$, 11.13. Found: N, 8.78; Cl$^-$, 11.06.

The anticholinesterase activity of N,N′-bis(2-diethylaminoethyl)succinamide bis(2-chlorobenzochloride) was found to be 23% that of neostigmine methylsulfate.

EXAMPLE 16

(a) N,N′-bis(2-diethylaminoethyl)adipamide was prepared from 50.5 g. (0.25 mole) of ethyl adipate and 62.6 g. (0.54 mole) of 2-diethylaminoethylamine according to the manipulative procedure described in Example 1, part (a). There was thus obtained 15.5 g. of N,N′-bis(2-diethylaminoethyl)adipamide.

(b) *N,N′-Bis(2-Diethylaminoethyl)adipamide Bis(2-Chlorobenzochloride)*

[III; Ar is 2-ClC$_6$H$_4$, A is CH$_2$CH$_2$, N=B is N(C$_2$H$_5$)$_2$, Y is CH$_2$CH$_2$CH$_2$CH$_2$, X is Cl]

A solution of 15.5 g. (0.045 mole) of N,N′-bis(2-diethylaminoethyl)adipamide and 25.7 g. (0.16 mole) of 2-chlorobenzyl chloride in 100 ml. of acetonitrile was refluxed for seven hours. The product was worked up by the manipulative procedure described in Example 1, part (b), and the product was dried in a vacuum oven at 80° C. (1–3 mm.), giving 17.8 g. of N,N′-bis(2-diethylaminoethyl)adipamide bis(2-chlorobenzochloride), M.P. 179–180° C.

*Analysis.*—Calcd. for C$_{32}$H$_{50}$Cl$_4$N$_4$O$_2$: N, 8.43; Cl$^-$, 10.67. Found: N, 8.30; Cl$^-$, 10.67.

The anticholinesterase activity of N,N′-bis(2-diethylaminoethyl)adipamide bis(2 - chlorobenzochloride) was found to be 20% that of neostigmine methylsulfate.

EXAMPLE 17

(a) N,N′ - bis(2 - diethylaminoethyl)suberamide was prepared from 8.8 g. (0.038 mole) of ethyl suberate and 18.6 g. (0.16 mole) of 2-diethylaminoethylamine according to the manipulative procedure described in Example 1, part (a), the reaction mixture being refluxed for fifty-four hours. There was thus obtained 10.0 g. of N,N′-bis(2-diethylaminoethyl)suberamide as a colorless solid.

(b) *N,N′-Bis(2-Diethylaminoethyl)suberamide Bis(2-Chlorobenzochloride)*

[III; Ar is 2-ClC$_6$H$_4$, A is CH$_2$CH$_2$, N=B is N(C$_2$H$_5$)$_2$, Y is CH$_2$CH$_2$CH$_2$CH$_2$CH$_2$CH$_2$, X is Cl]

A solution of 10.0 g. (0.027 mole) of N,N′-bis(2-diethylaminoethyl)suberamide and 17.7 g. (0.11 mole) of 2-chlorobenzyl chloride in 100 ml. of acetonitrile was refluxed for sixteen hours. The crystalline material which had separated was collected by filtration and purified by the manipulative procedure described in Example 1, part (b), giving 7.4 g. of N,N′-bis(2-diethylaminoethyl)suberamide bis (2-chlorobenzochloride), M.P. 148–150° C.

*Analysis.*—Calcd. for C$_{34}$H$_{54}$Cl$_4$N$_4$O$_2$: N, 8.09; Cl$^-$, 10.24. Found: N, 8.10; Cl$^-$, 10.40.

The anticholinesterase activity of N,N′-bis(2-diethylaminoethyl)suberamide bis(2-chlorobenzochloride) was found to be 53% that of neostigmine methylsulfate.

EXAMPLE 18

*N,N′-Bis(2-Diethylaminoethyl)Terephthalamide Bis(2-Chlorobenzochloride)*

[III; Ar is 2-ClC$_6$H$_4$, A is CH$_2$CH$_2$, N=B is N(C$_2$H$_5$)$_2$, Y is p-C$_6$H$_4$, X is Cl]

A solution of 17 g. (0.047 mole) of N,N′-bis(2-diethylaminoethyl)terephthalamide and 32 g. (0.20 mole) of 2-chlorobenzyl chloride in 300 ml. of acetonitrile was refluxed for about fifteen hours. The solid which separated was collected by filtration and recrystallized from absolute ethanol, giving 10.8 g. of N,N′-bis(2-diethylaminoethyl)terephthalamide bis(2-chlorobenzochloride), M.P. 191–194° C.

*Analysis.*—Calcd. for C$_{34}$H$_{46}$Cl$_4$N$_4$O$_2$: N, 8.18; Cl$^-$, 10.36. Found: N, 8.37; Cl$^-$, 10.20.

The anticholinesterase activity of N,N′-bis(2-diethylaminoethyl)terephthalamide bis(2-chlorobenzochloride) was found to be 780% that of neostigmine methylsulfate.

EXAMPLE 19

(a) N,N′-bis(2-dipropylaminoethyl)oxamide was prepared from 7.3 g. (0.05 mole) of ethyl oxalate and 19.2 g. (0.13 mole) of 2-dipropylaminoethylamine according to the manipulative procedure described in Example 1, part (a). There was thus obtained 21 g. of N,N'-bis-(2-dipropylaminoethyl)oxamide as a waxy solid.

(b) *N,N'-Bis(2-Dipropylaminoethyl)Oxamide Bis(2-Chlorobenzochloride)*

[II; R is Cl, A is $CH_2CH_2$, N=B is $N(n-C_3H_7)_2$, X is Cl]

A solution of 15.6 g. (0.05 mole) of N,N'-bis(2-dipropylaminoethyl)oxamide and 32.2 g. (0.22 mole) of 2-chlorobenzyl chloride in 60 ml. of acetonitrile was refluxed for twelve hours. N,N'-(bis(2-dipropylaminoethyl)oxamide bis(2-chlorobenzochloride) was obtained as a colorless crystalline solid, M.P. 134–135° C.

*Analysis.*—Calcd. for $C_{32}H_{50}Cl_4N_4O_2$: N, 8.43; Cl⁻, 10.67. Mound: N, 8.46; Cl⁻, 11.19.

The anticholinesterase activity of N,N'-bis(2-dipropylaminoethyl)oxamide bis(2-chlorobenzochloride) was found to be 17% that of neostigmine methylsulfate.

EXAMPLE 20

(a) *N,N'-Bis(3-Dipropylaminopropyl)Oxamide*

3-dipropylaminopropylamine (87.0 g., 0.55 mole) was added in portions over a period of about twenty minutes to 36.5 g. (0.25 mole) of diethyl oxalate. After the exothermic reaction had slowed down, the mixture was refluxed for five hours, then allowed to stand at room temperature for about fifteen hours, and the volatile material was removed in vacuo on a steam bath. There was thus obtained 80 g. of N,N'-bis(3-dipropylaminopropyl)oxamide. A sample of the material was dissolved in ethanol, an excess of ethanolic hydrochloride was added, and the solution was concentrated in vacuo. The residue was recrystallized from ethanol, giving the dihydrochloride salt of N,N'-bis(3-dipropylaminopropyl)oxamide M.P. 198–201° C.

*Analysis.*—Calcd. for $C_{20}H_{42}N_4O_2 \cdot 2HCl$: N, 12.63; Cl⁻, 15.99. Found: N, 12.35; Cl⁻, 16.25.

(b) *N,N'-Bis(3-Dipropylaminopropyl)Oxamide Bis(2-Chlorobenzochloride)*

[II; R is Cl, A is $CH_2CH_2CH_2$, N=B is $N(n-C_3H_7)_2$, X is Cl]

A solution of 18.8 g. (0.05 mole) of N,N'-bis(3-dipropylaminopropyl)oxamide and 21.9 g. (0.13 mole) of 2-chlorobenzyl chloride in 90 ml. of acetonitrile was refluxed for twenty-four hours. From the solution there was obtained 14.9 g. of N,N'-bis(3-dipropylaminopropyl)oxamide bis(2-chlorobenzochloride), M.P. 70–75° C. in the form of hygroscopic crystals.

EXAMPLE 21

(a) N,N'-bis(3-dibutylaminopropyl)oxamide was prepared from 36.5 g. (0.25 mole) of diethyl oxalate and 93.2 g. (0.050 mole) of 3-dibutylaminopropylamine according to the manipulative procedure described above in Example 20, part (a). There was thus obtained 82 g. of N,N'-bis(3-dibutylaminopropyl)oxamide, M.P. 50–51° C. The hydrochloride salt had the M.P. 183–186° C. when recrystallized from absolute methanol.

*Analysis.*—Calcd. for $C_{24}H_{50}N_4O_2 \cdot 2HCl$: N, 11.22; Cl⁻, 14.19. Found: N, 10.92; Cl⁻, 14.00.

(b) *N,N'-Bis(3-Dibutylaminopropyl)Oxamide Bis(2-Chlorobenzochloride)*

[II; R is Cl, A is $CH_2CH_2CH_2$, N=B is $N(n-C_4H_9)_2$, X is I]

A solution of 21.3 g. (0.05 mole) of N,N'-bis(3-dibutylaminopropyl)oxamide and 21.9 g. (0.13 mole) of 2-chlorobenzyl chloride in 180 ml. of acetonitrile was refluxed for six and one-half hours. The solution was concentrated to dryness in vacuo, and a 10 g. sample of the oily residue was dissolved in 100 ml. of deionized water and 4.95 g. of potassium iodide in a small volume of deionized water was added. The gum which separated was crystallized from dilute aqueous isopropyl alcohol, giving 3.3 g. of N,N'-bis(3-dibuaylaminopropyl)oxamide bis(2-chlorobenziodide), M.P. 170–175° C.

EXAMPLE 22

(a) N,N'-bis(4-diethylaminobutyl)oxamide was prepared from 22.0 g. (0.15 mole) of ethyl oxalate and 43.4 g. (0.30 mole) of 4-diethylaminobutylamine according to the manipulative procedure described above in Example 20, part (a). There was thus obtained N,N'-bis(4-diethylaminobutyl)oxamide, M.P. 56–57.5° C. when recrystallized from hexane.

*Analysis.*—Calcd. for $C_{18}H_{38}N_4O_2$: C, 63.12; H, 11.18. Found: C, 62.91; H, 11.17.

The hydrochloride salt of N,N'-bis(4-diethylaminobutyl)oxamide had the M.P. 162–167° C. when recrystallized from a methanol-ether mixture.

*Analysis.*—Calcd. for $C_{18}H_{38}N_4O_2 \cdot 2HCl$: C⁻, 17.07. Found: Cl⁻, 17.07.

(b) *N,N'-Bis(4-Diethylaminobutyl)Oxamide Bis(2-Chlorobenziodide)*

[II: R is Cl, A is $CH_2CH_2CH_2CH_2$, N=B is $N(C_2H_5)_2$, X is I]

A solution of 17.1 g. (0.05 mole) of N,N'-bis(4-diethylaminobutyl)oxamide and 21.9 g. (0.13 mole) of 2-chlorobenzyl chloride in 120 ml. of acetonitrile was refluxed for five and one-half hours. The product thus obtained was converted to the iodide according to the procedure described above in Example 21, part (b), and the resulting product was recrystallized twice from water, giving N,N' - bis(4 - diethylaminobutyl)oxamide bis(2-chlorobenziodide), M.P. 144.5–148.5° C.

*Analysis.*—Calcd. for $C_{32}H_{50}Cl_2I_2N_4O_2$: N. 6.61; I⁻, 29.95. Found: N, 6.52; I⁻, 29.60.

The anticholinesterase activity of N,N'-bis(4-diethylaminobutyl)oxamide bis(2-chlorobenziodide) was found to be 340% that of neostigmine methylsulfate.

EXAMPLE 23

(a) N,N'-bis(5-diethylaminopentyl)oxamide was prepared from 22.0 g. (0.15 mole) of ethyl oxalate and 49.0 g. (0.31 mole) of 5-diethylaminopentylamine according to the manipulative procedure described above in Example 20, part (a). There was thus obtained 54.8 g. of N,N'-bis(5-diethylaminopentyl)oxamide, M.P. 60–64° C. A sample of the base was converted to its dihydrochloride salt, M.P. 158–162° C.

*Analysis.*—Calcd. for $C_{20}H_{42}N_4O_2 \cdot 2HCl$: N, 12.63; Cl⁻, 15.99. Found: N, 12.86; Cl⁻, 16.05.

(b) *N,N'-Bis(5-Diethylaminopentyl)oxamide Bis(2-Chlorobenziodide)*

[II; R is Cl, A is $CH_2CH_2CH_2CH_2CH_2$, N=B is $N(C_2H_2)_5$, X is I]

A solution of 18.5 g. (0.05 mole) of N,N'-bis(5-diethylaminopentyl)oxamide and 21.9 g. (0.10 mole) of 2-chlorobenzyl chloride in 120 ml. of acetonitrile was refluxed for six and one-half hours. The solution was concentrated in vacuo and the residue crystallized from an ethanol-ether mixture. The resulting N,N'-bis(5-diethylaminopentyl)oxamide bis(2-chlorobenzochloride), M.P. 119–140° C. was converted to the iodide as described above in Example 21, part (b), giving N,N'-bis(5-diethylaminopentyl)oxamide bis(2 - chlorobenziodide), M.P. 185–188° C.

*Analysis.*—Calcd. for $C_{34}H_{54}Cl_2I_2N_4O_2$: N, 6.40; I⁻, 28.99. Found: N, 6.12; I⁻, 28.58.

The anticholinesterase activity of N,N'-bis(5-diethylaminopentyl)oxamide bis(2-chlorobenziodide) was found to be 650% that of neostigmine methylsulfate.

EXAMPLE 24

(a) *Ethyl N-(2-Diethylaminoethyl)oxamate*

[IV; B=N is $(C_2H_5)_2N$, A is $CH_2CH_2$, Y is a single bond, R is $C_2H_5$]

Diethyl oxalate (306 g.) was placed in a 1 liter three-neck flask fitted with a mechanical stirrer, condenser and dropping funnel. To this was added with stirring 116 g. of 2-diethylaminoethylamine over a period of one-half an hour. Stirring of the warm solution was continued for two hours, then the mixture was left standing overnight. Distillation through a 6″ Vigreux column gave 175 g. of ethyl N-(2-diethylaminoethyl)oxamate, B.P. 112–122° C./1 mm., $n_D^{25}$=1.4595.

*Analysis.*—Calcd. for $C_{10}H_{20}N_2O_3$: $N_{total}$, 12.95; $N_{basic}$, 6.47. Found: $N_{total}$, 12.66; $N_{basic}$, 6.32.

(b) *Ethyl N-[2-(2-Chlorobenzyldiethylammonio)ethyl] oxamate Chloride*

[V; Ar is $2\text{-}ClC_6H_4$, B=N is $(C_2H_5)_2N$, A is $CH_2CH_2$, Y is a single bond, R is $C_2H_5$, X is Cl]

A mixture of 21.6 g. of ethyl N-(2-diethylaminoethyl)oxamate, 20 g. of 2-chlorobenzyl chloride and 25 ml. of dry acetonitrile was refluxed for twenty hours. The solution was cooled, reduced to about one-third the original volume by boiling off acetonitrile and then diluted with ether, whereupon a white crystalline material separated. The solid was collected by filtration, then dissolved in ethanol, reprecipitated with ether, filtered and dried over phosphorus pentoxide in a vacuum desiccator at 0.5 mm. to give 26 g. of ethyl N-[2-(2-chlorobenzyldiethylammonio)ethyl]oxamate chloride, M.P. 88.5° C.

*Analysis.*—Calcd. for $C_{17}H_{27}Cl_2N_2O_3$: N, 7.40; Cl⁻, 9.37. Found: N, 7.35; Cl⁻, 9.00.

(c) *N-[2-(2-Chlorobenzyldiethylammonio)ethyl]-N'-(2-Diethylaminoethyl)oxamide Chloride*

[VI; Ar is $2\text{-}ClC_6H_4$, B=N and N=B' are $(C_2H_5)_2N$, A and A' are $CH_2CH_2$, Y is a single bond, X is Cl]

A solution of 50 g. of ethyl N-[2-(2-chlorobenzyldiethylammonio)ethyl]oxamate chloride and 31 g. of 2-diethylaminoethylamine in 200 ml. of ethanol was refluxed for seventeen hours. Most of the solvent was evaporated and the residue poured into ether to precipitate white crystals which were collected by filtration and purified by reprecipitation with alcohol-ether. After filtration and drying in a vacuum oven at 65° C./1 mm. there was obtained 41 g. of N-[2-(2-chlorobenzyldiethylammonio)ethyl]-N'-(2-diethylaminoethyl)oxamide chloride, M.P. 134° C.

*Analysis.*—Calcd. for $C_{21}H_{36}Cl_2N_4O_2$: N, 12.52; Cl⁻, 7.92. Found: N, 12.43; Cl⁻, 8.15.

By replacement of the 2-diethylaminoethylamine in the preceding example by a molar equivalent amount of 2-ethylpropylaminoethylamine, 3-diethylaminopropylamine, 3-diisopropylaminopropylamine, or 1-diethylamino-4-aminopentane, there can be obtained, respectively, N-[2-(2-chlorobenzyldiethylammonio)ethyl]-N'-(2 - ethylpropylaminoethyl)oxamide chloride, N-[2-(2-chlorobenzyldiethylammonio)ethyl] - N' - (3-diethylaminopropyl)oxamide chloride, M.P. 142.5° C., N-[2-(2-chlorobenzyldiethylammonio)ethyl] - N' - (3-diisopropylaminopropyl)oxamide chloride, or N-[2-(2-chlorobenzyldiethylammonio)ethyl]-N'-(4-diethylaminopentyl)oxamide chloride.

(d) *N-[2 - (2 - Chlorobenzyldiethylammonio)ethyl]-N'-[2-(Benzyldiethylammonio)ethyl]oxamide Dichloride*

[I; $R^1$ is Cl, $R^2$, $R^3$ and $R^4$ are H, A and A' are $CH_2CH_2$, Y is a single bond, N=B and N=B' are $N(C_2H_5)_2$, X and X' are Cl]

A solution of 30 g. (0.066 mole) of N-[2-(2-chlorobenzyldiethylammonio)ethyl]-N'-(2 - diethylaminoethyl)oxamide chloride and 12.6 g. (0.1 mole) of benzyl chloride in 200 ml. of acetonitrile was refluxed for six hours. The solid material which separated was collected by filtration and recrystallized twice from an ethanol-ether mixture and then from an isopropyl alcohol-acetone mixture, giving N-[2-(2 - chlorobenzyldiethylammonio)ethyl]-N'-[2 - (benzyldiethylammonio)ethyl]oxamide dichloride, M.P. 204–208° C.

*Analysis.*—Calcd. for $C_{28}H_{43}Cl_3N_4O_2$: N, 9.76; Cl⁻, 12.35. Found: N, 9.82; Cl⁻, 12.18.

The anticholinesterase activity of N-[2-(2-chlorobenzyldiethylammonio)ethyl]-N'-[2 - (benzyldiethylammonio)ethyl]oxamide dichloride was found to be 430% that of neostigmine methylsulfate.

By replacement of the benzyl chloride in the preceding example by a molar equivalent amount of 2,4-dichlorobenzyl chloride, 3,4-dichlorobenzyl chloride, 2-methoxybenzyl chloride, 2-chloro-4-methoxybenzyl chloride, 4-ethoxybenzyl chloride, 2-bromobenzyl bromide, or 2-iodobenzyl bromide, there can be obtained, respectively, N-[2-(2 - chlorobenzyldiethylammonio] - N'-[2 - (2,4 - dichlorobenzyldiethylammonio)ethyl]oxamide dichloride [I; $R^1$ is Cl, $R^2$ is H, $R^3$ is 2-Cl, $R^4$ is 4-Cl, A and A' are $CH_2CH_2$, N=B and N=B' are $N(C_2H_5)_2$, X and X' are Cl], N-[2-(2-chlorobenzyldiethylammonio)ethyl] - N' - [2-(3,4 - dichlorobenzyldiethylammonio)ethyl]oxamide dichloride [I; $R^1$ is Cl, $R^2$ is H, $R^3$ is 3-Cl, $R^4$ is 4-Cl, A and A' are $CH_2CH_2$, N=B and N=B' are $N(C_2H_5)_2$, X and X' are Cl], N-[2-(2-chlorobenzyldiethylammonio)ethyl] - N' - [2 - (2 - methoxybenzyldiethylammonio)ethyl]oxamide dichloride [I; $R^1$ is Cl, $R^2$ is H, $R^3$ is 2-$OCH_3$, $R^4$ is H, A and A' are $CH_2CH_2$, N=B and N=B' are $N(C_2H_5)_2$, X and X' are Cl], N-[2 - (2 - chlorobenzyldiethylammonio)ethyl]-N' - [2 - (2 - chloro - 4 - methoxybenzyldiethylammonio)ethyl]oxamide dichloride [I; $R^1$ is Cl, $R^2$ is H, $R^3$ is 2-Cl, $R^4$ is 4-$OCH_3$, A and A' are $CH_2CH_2$, N=B and N=B' are $N(C_2H_5)_2$, X and X' are Cl], N-[2-(2-chlorobenzyldiethylammonio)ethyl]-N' - [2 - (4 - ethoxybenzyldiethylammonio)ethyl]oxamide dichloride [I; $R^1$ is Cl, $R^2$ is H, $R^3$ is H, $R^4$ is 4-$OC_2H_5$, A and A' are $CH_2CH_2$, N=B and N=B' are $N(C_2H_5)_2$, X and X' are Cl], N-[2-(2-chlorobenzyldiethylammonio)ethyl]-N'-[2 - (2 - bromobenzyldiethylammonio)ethyl]oxamide chloride bromide [I; $R^1$ is Cl, $R^2$ is H, $R^3$ is 2-Br, $R^4$ is H, A and A' are $CH_2CH_2$, N=B and N=' are $N(C_2H_5)_2$, X is Cl, X' is Br], or N -[2-(2-chlorobenzyldiethylammonio)ethyl] - N' - [2 - (2 - iodobenzyldiethylammonio)-ethyl]oxamide chloride bromide [I; $R^1$ is Cl, $R^2$ is H, $R^3$ is 2-I, $R^4$ is H, A and A' are $CH_2CH_2$, N=B and N=B' are $N(C_2H_5)_2$, X is Cl, X' is Br].

By replacement of the N-[2-(2-chlorobenzyldiethylammonio)ethyl] - N' - (2 - diethylaminoethyl)oxamide chloride in the preceding example by a molar equivalent amount of N-[2-(2-chlorobenzyldiethylammonio)ethyl]-N' - (2 - ethylpropylaminoethyl)oxamide chloride, N-[2 - (2 - chlorobenzyldiethylammonio)ethyl] - N' - (3-diethylaminopropyl)oxamide chloride, N-[2-(2-chlorobenzyldiethylammonio)ethyl] - N' - (3 - diisopropylaminopropyl)oxamide chloride, or N-[2-(2-chlorobenzyldiethylammonio)ethyl] - N' - (4 - diethylaminopentyl)-oxamide chloride, there can be obtained, respectively, N - [2 - (2 - chlorobenzyldiethylammonio)ethyl] - N'-[2 - (benzylethylpropylammonio)ethyl]oxamide dichloride [I; $R^1$ is Cl, $R^2$, $R^3$ and $R^4$ are H, A and A' are $CH_2CH_2$, N=B is $N(C_2H_5)_2$, N=B' is $N(C_2H_5)(C_3H_7)$, X and X' are Cl], N-[2-(2-chlorobenzyldiethylammonio)ethyl] - N' - [3 - (benzyldiethylammonio)propyl]oxamide dichloride [I; $R^1$ is Cl, $R^2$, $R^3$ and $R^4$ are H, A is $CH_2CH_2$, A' is $CH_2CH_2CH_2$, N=B and N=B' are $N(C_2H_5)_2$, X and X' are Cl], N-[2-(2-chlorobenzyldiethylammonio)ethyl] - N' - [3 - (benzyldiisopropylammonio)propyl]oxamide dichloride [I; $R^1$ is Cl, $R^2$, $R^3$ and $R^4$ are H, A is $CH_2CH_2$, A' is $CH_2CH_2CH_2$, N=B is $N(C_2H_5)_2$, N=B' is $N(iso\text{-}C_3H_7)_2$, X and X' ar Cl], or N-[2 - (2 - chlorobenzyldiethylammonio)ethyl]-N'-[4 - (benzyldiethylammonio)pentyl]oxamide dichloride

[I; $R^1$ is Cl, $R^2$, $R^3$ and $R^4$ are H, A is $CH_2CH_2$, A' is $CH(CH_3CH_2CH_2CH_2)$, N=B and N=B' are $N(C_2H_5)_2$, X and X' are Cl].

The compounds of the foregoing examples have an anticholinesterase activity of the type exhibited by neostigmine and hence may be used as skeletal muscle stimulants and as antidote to curare. They are active at dose levels of about 0.001–1.0 mg./kg. of body weight, whereas the toxicity ($LD_{50}$), as measured upon subcutaneous administration in mice, ranges from about 2.0 mg./kg. for the more active compounds to about 10 mg./kg. for the less active compounds. The compounds can be administered orally as tablets or capsules compounded with the usual excipients, or parenterally as aqueous solutions, in the known manner as is neostigmine.

Another aspect of my invention resides in pharmacodynamic compositions including the novel compounds herein disclosed together with excipients. By an excipient I mean any inert substance used to give the compositions a suitable form or consistency. In the case of solid compositions for oral administration, the excipient is an innocuous, tasteless or pleasant tasting solid such as starch, lactose, talc, acacia, or the like. In the case of liquid compositions for parenteral administration, the excipient is sterile water, optionally containing additional compatible solutes for buffering and the like purposes.

This application is a continuation-in-part of my copending application Serial No. 360,836, filed June 10, 1953, now abandoned.

I claim:

1. A compound having the formula

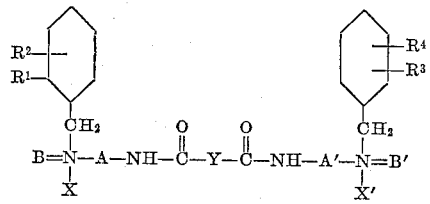

wherein $R^1$ is a lower-alkoxy group, $R^2$, $R^3$ and $R^4$ are members of the group consisting of hydrogen and lower-alkoxy groups, A and A' are lower-alkylene radicals, N=B and N=' are di-lower-alkylamino radicals in which the alkyl groups each have at least two carbon atoms, Y is a member of the group consisting of $C_nH_{2n}$, where n is a whole number from 0 to 6, and the 1,4-phenylene group, X and X' are anions, and the tertiary-amine nitrogens and the amide nitrogens are attached to different carbon atoms of A and A'.

2. An N,N' - bis(di - lower - alkylamino - lower-alkyl)oxamide bisbenzohalide in which at least one of the benzyl groups has a halogen atom in the ortho-position, and in which the lower-alkyl groups of the di-lower-alkylamino radicals each have at least two carbon atoms.

3. A compound having the formula

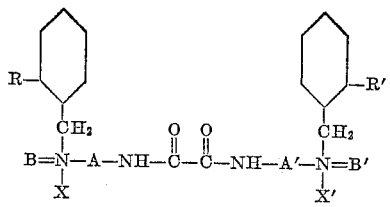

wherein R and R' are halogen atoms, A and A' are lower-alkylene radicals, N=B and N=B' are di-lower-alkylamino radicals in which the alkyl groups each have at least two carbon atoms, X and X' are anions, and the tertiary-amine nitrogens and the amide nitrogens are attached to different carbon atoms of A and A'.

4. A compound having the formula

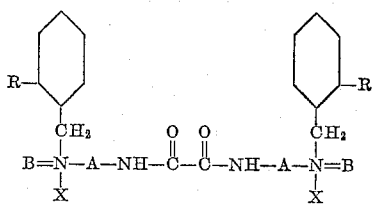

wherein R is a halogen atom, A is a lower-alkylene radical, N=B is a di-lower-alkylamino radical in which the alkyl groups each have at least two carbon atoms, X is a halide ion, and the tertiary-amine nitrogens and the amide nitrogens are attached to different carbon atoms A.

5. A compound having the formula

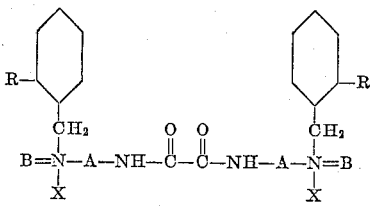

wherein R is a lower-alkoxy group, A is a lower-alkylene radical, N=B is a di-lower-alkylamino radical in which the alkyl groups each have at least two carbon atoms, X is a halide ion, and the tertiary-amine nitrogens and the amide nitrogens are attached to different carbon atoms of A.

6. A compound having the formula

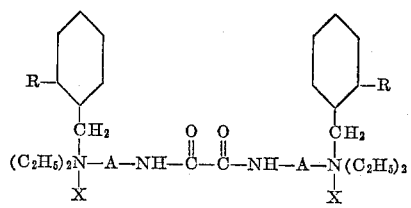

wherein R is a halogen atom, A is a lower-alkylene radical, X is a halide ion, and the tertiary-amine nitrogens and the amide nitrogens are attached to different carbon atoms of A.

7. A compound having the formula

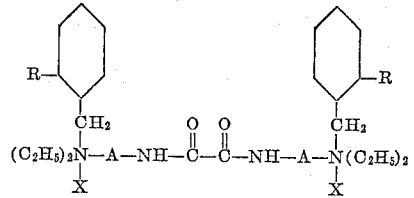

wherein R is a lower-alkoxy group, A is a lower-alkylene radical, X is a halide ion, and the tertiary-amine nitrogens and the amide nitrogens are attached to different carbon atoms of A.

8. A compound having the formula

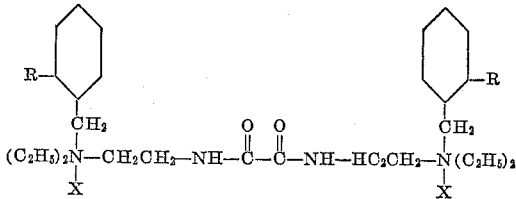

wherein R is a halogen atom and X is a halide ion.

9. A compound having the formula

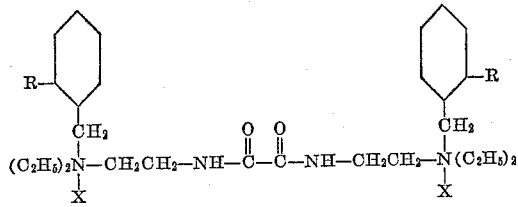

wherein R is a lower-alkoxy group and X is a halide ion.

10. A compound having the formula

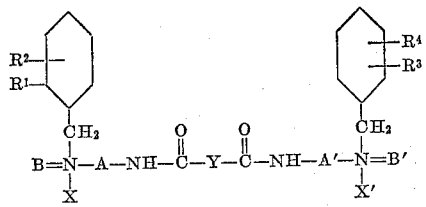

wherein $R^1$ is a halogen, $R^2$, $R^3$ and $R^4$ are members of the group consisting of hydrogen and halogen, A and A' are lower-alkylene radicals, N=B and N=B' are di-lower-alkylamino radicals in which the alkyl groups each have at least two carbon atoms, Y is a member of the group consisting of $C_nH_{2n}$, where $n$ is a whole number from 0 to 6, and the 1,4-phenylene group, X and X' are anions, and the tertiary-amine nitrogens and the amide nitrogens are attached to different carbon atoms of A and A'.

11. N,N' - bis(2 - diethylaminoethyl)oxamide bis(2-chlorobenzohalide).

12. N,N' - bis(2 - diethylaminoethyl)oxamide bis(2-bromobenzohalide).

13. N,N' - bis-(2 - diethylaminoethyl)oxamide bis(2-iodobenzohalide).

14. N,N' - bis(2 - diethylaminoethyl)oxamide bis(2-methoxybenzohalide).

15. N,N' - bis(3 - diethylaminopropyl)oxamide bis(2-chlorobenzohalide).

16. The process for preparing a compound having the formula

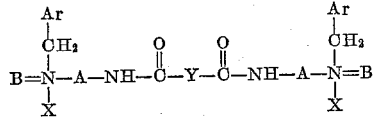

wherein Ar is a phenyl group substituted by from one to two lower-alkoxy groups, one such group being in the ortho-position, A is a lower-alkylene radical, N-B is a di-lower-alkylamino radical in which the alkyl groups each have at least two carbon atoms, Y is a member of the group consisting of $C_nH_{2n}$, where $n$ is a whole number from 0 to 6, and the 1,4-phenylene group, X is the anion of a strong acid, and the tertiary-amine nitrogens and the amide nitrogens are attached to different carbon atoms of A; which comprises mixing a compound having the formula

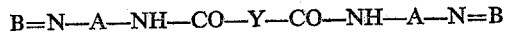

B=N—A—NH—CO—Y—CO—NH—A—N=B with at least two molar equivalents of a compound having the formula $ArCH_2X$ in an inert solvent.

17. The process for preparing a compound having the formula

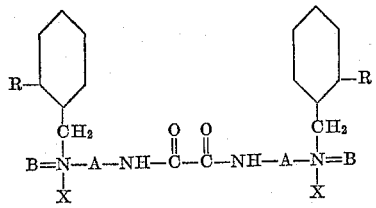

wherein R is a halogen atom, A is a lower-alkylene radical, N=B is a di-lower-alkylamino radical in which the alkyl groups each have at least two carbon atoms, X is a halide ion, and the tertiary-amine nitrogens and the amide nitrogens are attached to different carbon atoms of A, which comprises mixing a compound having the formula   B=N—A—NH—CO—CO—NH—A—N=B with at least two molar equivalents of a compound having the formula $2-RC_6H_4CH_2X$ in an inert solvent.

18. The process for preparing a compound having the formula

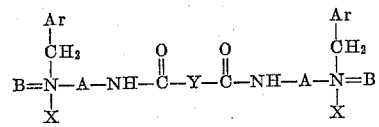

wherein Ar is a phenyl group substituted by from one to two halogens, one such group being in the ortho-position, A is a lower-alkylene radical, N=B is a di-lower-alkylamino radical in which the alkyl groups each have at least two carbon atoms, Y is a member of the group consisting of $C_nH_{2n}$, where $n$ is a whole number from 0 to 6, and the 1,4-phenylene group, X is the anion of a strong acid, and the tertiary-amine nitrogens and the amide nitrogens are attached to different carbon atoms of A; which comprises treating a compound having the formula  B=N—A—NH—CO—Y—CO—NH—A—N=B with a least two molar equivalents of a compound having the formula $ArCH_2X$.

19. The process for preparing N,N'-bis(2-diethylaminoethyl)oxamide bis(2-chlorobenzohalide) which comprises mixing N,N' - bis(2 - diethylaminoethyl)oxamide with at least two molar equivalents of 2-chlorobenzyl halide in an inert solvent.

References Cited in the file of this patent

UNITED STATES PATENTS

| | | |
|---|---|---|
| 2,624,763 | Goldberg et al. | Jan. 6, 1953 |
| 2,653,898 | Castillo et al. | Sept. 29, 1953 |

OTHER REFERENCES

Phillips: "J. Am. Chem. Soc.," volume 73 (December 1951), pages 5822 to 5824.

Randall: "J. Pharm. Expt. Therap.," volume 105 (1952), pages 19 and 24 (article pages), 16 to 26.

Arnold et al.: Proc. Soc. Exptl. Biol. Med.," volume 87 (1954), pages 393 and 394.